United States Patent Office 3,499,950
Patented Mar. 10, 1970

3,499,950
ANTISTATIC THERMOPLASTIC COPOLYMERS
Hans Weitzel and Harold Ebneth, Leverkusen, Karl Dinges, Odenthal, and Harry Röhr, Cologne, Germany, assignors to Farbenfabriken Bayer Aktiengesellschaft, Leverkusen, Germany, a corporation of Germany
No Drawing. Filed Jan. 13, 1967, Ser. No. 608,955
Claims priority, application Germany, Mar. 5, 1966, F 48,595
Int. Cl. C08f 41/12
U.S. Cl. 260—876   9 Claims

ABSTRACT OF THE DISCLOSURE

Antistatic moulding compositions comprising (a) a graft copolymer of a mixture of styrene and acrylonitrile or alkyl derivatives thereof grafted onto a diolefin polymer, (b) optionally a copolymer of styrene and acrylonitrile or alkyl derivatives thereof, (c) copolymers of a conjugated diolefin with esters and/or nitriles of ethylenically unsaturated carboxylic acids wherein a portion of the esters or nitriles may be replaced by acrylic acid or methacrylic acid and (d) polypropylene glycols whose terminal hydroxyl groups are optionally etherified or esterified.

This invention relates to moulding compositions based on thermoplastic graft copolymer mixtures showing outstanding antistatic properties.

One advantage of conventional thermoplastic moulding compositions based on graft copolymer mixtures of butadiene, esters of acrylic or methacrylic acid, styrene and acrylonitrile is that they combine high impact and notched impact strength with considerable hardness and tensile strength. Unfortunately, these materials which are known per se have an extremely high electrical surface resistance which greatly impairs their electrostatic properties. For example, consumer goods produced from these moulding compositions very rapidly attract dust and for this reason are unsuitable for many applications.

Various processes have already been proposed with a view to avoiding or at least reducing the electrostatic charging of some thermoplastic moulding compositions, e.g., cellulose acetate and cellulose propionate. Mouldings produced from these materials are exposed to air saturated with moisture. The absorption of a certain quantity of water vapour reduces the surface resistance of these mouldings to such extent that they do not attract dust or become soiled. Unfortunately the mouldings very quickly lose their water content and their initially outstanding antistatic properties upon standing in dry air.

An alternative method of reducing electrostatic charging used for example in polyolefins comprises treating the surface of the mouldings with antistatic agents to develop a conductive film which prevents electrostatic charging. However such a film is very quickly worn or rubbed off in use, and the antistatic agent is often extremely hygroscopic, so that the surface of the moulding is impaired. The antistatic agents are furthermore often physiologically unacceptable.

It has further already been proposed to introduce compounds with an antistatic effect, such as amines, amides, salts of quaternary ammonium bases, sulphonic acids, aryl-alkyl sulphonates, phosphoric acids, aryl-alkyl phosphates, polyglycols and their derivatives, fatty acid esters of polyglycols aryl and alkyl ethers of polyglycols and even polyalcohols, into the thermoplastic moulding compositions before they are processed. In order to obtain an adequate antistatic effect, however, these compounds had to be added in high quantities so that the mechanical properties of the mouldings produced from them were no longer satisfactory, i.e., considerable decreases in hardness, stiffness and thermal stability under load were unavoidable.

The antistatic effect of all these known antistatic agents is ultimately dependent upon the development on the surface of the moulding of a film of moisture which improves surface conductivity.

According to French patent specification No. 1,250,926, polyalkylene glycols with a molecular weight of between 200 and 1200 are added as antistatic agents to mouldings produced from polyolefins in order to prevent electrostatic charging. Unfortunately, the effect of the polyalkylene glycols used, which are added in a concentration of between 0.01 and 0.5% by weight, is only adequate if their solubility in water is at least 0.5 g. per 100 g. of water, at 25° C. However, moulding compositions whose electrostatic charging is reduced by the addition of such water-soluble polyalkylene glycols, due to the development of a film of water over their surface, are deprived of their antistatic properties where the mouldings produced from them come into prolonged contact with water or moisture, as is frequently the case in practice.

It is also known from Belgian patent specification No. 650,391 to produce thermoplastically mouldable plastics showing good antistatic properties by working polypropylene glycols, which are almost insoluble in water, into graft copolymer mixtures of elastomeric graft polymers of styrene and acrylonitrile on polybutadiene and thermoplastic copolymers based on styrene-acrylonitrile.

It is an object of this invention to produce moulding compositions of graft polymers comprising styrene and acrylonitrile or their respective alkyl derivatives grafted onto an elastomeric polymer of a conjugated diolefin, wherein actually only part of the styrene and acrylonitrile or their alkyl derivatives has to be grafted and the remainder, if any, is in the form of an admixed copolymer, which exhibit improved antistatic properties.

A further object are antistatic moulding compositions complying to the above definition.

Generally speaking, these objects are achieved by admixing to said moulding compositions an appropriate quantity of a synergistic mixture of—

(a) copolymers of a conjugated diolefin with the esters and/or nitriles of ethylenically unsaturated carboxylic acids wherein part of the esters or nitriles can be replaced by acrylic acid or methacrylic acid and
(b) polypropylene glycols whose terminal hydroxyl groups are optionally etherified or esterified.

Although butadiene and isoprene are particularly suitable diolefins for the preparation of the aforementioned polymers, other dienes can also be used.

Esters and nitriles suitable for preparing the copolymers of a diolefin with esters and/or nitriles of ethylenically unsaturated carboxylic acids, are in particular esters and nitriles of acrylic acid, methacrylic acid and/or fumaric acid. The alcohol moiety of the ester is preferably an aliphatic alcohol with 1 to 10 carbon atoms.

Suitable polypropylene glycols which in combination with the above copolymers have a synergistic action are polypropylene glycols which are almost insoluble in water or ether or esters derived from them; the degree of polymerisation of these compounds being from 10 to 1000, although it is preferably from 15 to 200. Preferred ester and ether components are aliphatic carboxylic acids with 1 to 18 carbon atoms or alcohols with 1 to 20 carbon atoms.

The antistatic effect of these substances does not appear to be based on the formation of a film of water over the surface of the mouldings produced from the material, as is the case with other antistatic substances. Even when the mouldings are stored in water the anti-static additives according to this invention do not lose their effect as apparently they are not dissolved out, because of their insolubility in water.

Preferred thermoplastic moulding compositions showing outstanding antistatic properties are prepared from:

(A) 5 to 98% by weight, and preferably 5 to 60% by weight, of a graft copolymer prepared by the graft polymerisation of—
  (a) 10 to 95% by weight, and preferably 10 to 80% by weight, of a mixture of—
    (i) 50 to 90% by weight of styrene, and
    (ii) 50 to 10% by weight of acrylonitrile,
  wherein these two components can be replaced either completely or in part by their respective alkyl derivatives, on
  (b) 90 to 5% by weight, and preferably 90 to 20% by weight, of a polymer of a conjugated diolefin containing at least 80% by weight of polymerised diolefin and at most 20% by weight of styrene and/or acrylonitrile or alkyl derivatives thereof, and
(B) 0 to 93% by weight, and preferably 10 to 91% by weight, of a thermoplastic copolymer of—
  (a) 50 to 95% by weight of styrene, and
  (b) 50 to 5% by weight of acrylonitrile, or the alkyl derivatives of these two monomer components,
the total amount acrylonitrile and styrene or their alkyl derivatives in components A and B not being less than 50% by weight, and
(C) 1 to 35% by weight of a copolymer of—
  (a) 90 to 10% by weight, and preferably 85 to 15% by weight, of a conjugated diolefin and
  (b) 10 to 90% by weight, and preferably 15 to 85% by weight, of an ester and/or nitrile of an ethylenically unsaturated carboxylic acid,
wherein part of the ester or nitrile can be replaced by acrylic acid or methacrylic acid, and
(D) 1 to 10% by weight of a polypropylene glycol with a degree of polymerisation from 10 to 1000 and whose terminal OH-groups can be completely or partly esterified or etherified.

It is apparent from the foregoing that the resinforming monomers (styrene and acrylonitrile, for example) are preferably blended to some extent in the form of a copolymer B with the graft polymer component A. The preferred ratio of grafted to mixed styrene acrylonitrile is indicated above. It is in principle, also possible to graft all the resinforming monomers onto the graft bases from the outset, in which cases there would be no need for a separate mixing step with a resin copolymer component B, as is also apparent from the condition that the total amount of acrylonitrile and styrene in components A and B should not be less than 50% by weight.

According to a modification of the present invention, the polybutadiene can be replaced, as graft base for the preparation of graft polymer A, by copolymers of conjugated diolefins in admixture with one another, for example copolymers of butadiene with isoprene and other 1,3-dienes and copolymers of conjugated diolefins containing up to 20% of another copolymerisable monovinyl compound, for example, styrene and/or acrylonitrile.

Polymers with a polymerised butadiene content of at least 80% and a gel content (i.e. a component insoluble in toluene), of more than 80%, are of particular interest as the graft base.

The styrene and acrylonitrile to be grafted on (graft components) may be completely or partly replaced by alkyl derivatives of these compounds, α-methylstyrene in particular or nuclear-alkylated styrenes or methacrylonitrile. According to another preferred embodiment, a thermoplastic copolymer of styrene and acrylonitrile with a K-value [according to Fikentscher, Cellulose-Chemie 13, (1932) 58] of at least 40 and preferably from 55 to 80, is used as copolymer B.

Similarly, styrene and acrylonitrile may be completely or partly replaced in the thermoplastic copolymer B by alkyl derivatives of these components, in particular α-methylstyrene and/or nuclear-alkylated styrene (alkyl $C_1$–$C_6$) or methacrylonitrile.

Thermoplastic copolymers of 95 to 65% by weight of styrene and 5 to 40% by weight of acrylonitrile, in which the styrene may be completely replaced by α-methyl styrene, are of particular interest in this respect.

According to another preferred embodiment of the invention, component C is a copolymer of butadiene with an ester and/or a nitrile of acrylic, methacrylic or fumaric acid in which part of the ester or nitrile can be replaced by acrylic acid or methacrylic acid. The aforementioned copolymers may contain 1 to 20% by weight of polymerised acids. In the case of butadieneacrylonitrile copolymers, copolymers comprising polymerised acrylic or methacrylic acid are preferred.

According to a preferred embodiment, the acrylic acid, methacrylic acid or fumaric acid esters of component C are esters with alcohols having 1 to 10 carbon atoms, and may be used either individually or in admixture with one another.

According to a further modification of the present invention, mixtures of butadiene with isoprene or other 1,3-dienes can be used as the diene in the preparation of component C. Copolymers with a gel content (i.e. a component insoluble in toluene) of more than 60% are of particular interest.

Polypropylene glycols with a degree of polymerisation from 10 to 1000 and whose terminal OH-groups can be completely or partly etherified or esterified, are used as component D for the purposes of this invention. Alcohols with 1 to 20 carbon atoms are preferably used as the ether-forming alcohol component, and monocarboxylic acids with 1 to 18 carbon atoms are preferably used as as the ester-forming acid component. Linear or branched polypropylene glycols and polypropylene glycols whose polypropylene glycol chain is interrupted by ester or urethane groups, may be used. According to a preferred embodiment of the invention, completely linear polypropylene glycols with a degrees of polymerisation from 10 to 200, are used as component D.

Component A can be prepared, as known per se, by polymerising the monomers to be grafted on in the presence of the graft base either in emulsion, suspension or solution. Graft polymerisation is with advantage carried out in emulsion if the corresponding graft base is already present in emulsion. The graft base for component A can also be prepared, as known per se, by emulsion or solution polymerisation. Polymerisation is advantageously carried out in emulsion.

The copolymer components C can also be prepared, as known per se, by emulsion or solution polymerisation. Copolymerisation is with advantage carried out in emulsion.

In principle, the emulsifiers, regulators, polymerisation catalysts and electrolytes, hich are mentioned in connection with the preparation of copolymer component B may be used, within the limits specified, for the preparation of the graft base for graft polymer component A and of the graft polymer component A itself, and copolymer component C.

The thermoplastic copolymer B may be prepared, as known per se, by emulsion, suspension, solution or precipitation polymerisation.

Component B is also preferably polymerised in aqueous emulsion, in which case the usual quantities of water, emulsifiers, regulators, polymerisation catalysts, pH-regulators and other additives may be used. For example, the monomer or polymer concentration is from 20 to 50%, i.e. 400 to 100 parts by weight of water are used per 100 parts by weight of monomer.

The following are examples of suitable emulsifiers: sodium, potassium or ammonium salts of long-chain fatty acids with 10 to 20 carbon atoms, alkyl sulphates with 10 to 20 carbon atoms, alkyl sulphonates with 10 to 20 carbonates, alkyl-aryl sulphonates with 10 to 20 carbon atoms, resin acids (for example derivatives of abietic acid), and reaction products of ethylene oxide with long-chain fatty alcohols or phenols. It is preferred to use emulsifiers of the kind which lose their emulsifying action below pH 7 by the formation of the free acids.

Mercaptans, for example dodecyl mercaptan, may be used as regulators for regulating the molecular weight and hence for adjusting the requisite K-value.

Suitable polymerisation catalysts include inorganic or organic peroxy compounds or azo compound, for example potassium or ammonium persulphate, tert.-butyl hydroperoxide, cumene hydroperoxide, benzoyl peroxide, tert.-butyl perbenzoate, acetylcyclohexane sulphonyl peroxide, isopropylpercarbonate and azodiisobutyronitrile. It is also possible to use Redox systems of the aforementioned peroxy compounds and reducing agents, for example sodium pyrosulphite or bisulphite, sodium formaldehyde sulphoxylate, triethanolamine and tetra-ethylene pentamine.

Salts of orthophosphoric acid or pyrophosphoric acid, for example, may be used as pH-regulators. Polymerisation can be carried out at pH-values from 2 to 11 and at temperatures in the range from 20 to 100° C., preferably from 40 to 90° C.

The polypropylene glycols may be added to the graft polymer component A and copolymer components B and C to be used in accordance with the invention, in various ways.

(1) The polypropylene glycol can be mixed with a coagulate of the latex mixture of components A, B and C; the polyether itself is absorbed fairly effectively in the presence of water.

(2) The polypropylene glycols can be worked into a dry powder of the polymer mixture, preferably along with pigments, by means of suitable mixing units, for example single or twin-screw extruders or Banbury mixers.

(3) According to a preferred embodiment of the invention, an emulsion of the polypropylene glycol (as explained below) is mixed, preferably at room temperature, with the mixtures of the latices of components A, B and C and the resulting mixture is coagulated as known per se. It has proved to be of particular advantage to use ultra-finely divided polypropylene glycol emulsions.

The polypropylene glycol emulsion can be prepared by stirring the appropriate polyether into an aqueous emulsifier solution by means of a high-speed stirrer. The quantities of water to be used are preferably from 0.5 to 2 parts by weight of water to 1 part by weight of polyether. The emulsifiers employed in the preparation of the styrene-acrylonitrile copolymer are preferably used in quantities from 0.5 to 5% by weight, based on the polypropylene glycol.

The mixtures can be coagulated by methods known per se, for example by mixing the latex-polyether mixture with electrolytes, particularly inorganic salts or acids and optionally heating the resulting mixture at elevated temperature. The type of coagulant to be used will depend upon the emulsifiers present in the mixture. Electrolytes such as sodium chloride, calcium chloride, magnesium sulphate or aluminium sulphate, are mainly used in the case of emulsifiers effective both in the acid and in the alkaline range (alkyl sulphates, alkyl sulphonates and alkyl-aryl sulphonates). In the case of emulsifiers which do not act in the acid range, it is sufficient for coagulation to add an acid for example, hydrochloric acid or acetic acid.

It is also possible to effect coagulation by cooling the mixture to temperatures below 0° C. ("freezing out").

The coagulates are worked up by methods similar to those used to work up coagulates of thermoplastic copolymer mixtures, for example by separating the coagulates, washing them until they are neutral and free from electrolyte and drying them, preferably in vacuo, at a temperature below 100° C.

The dried material is then consolidated and homogenised on mills or similar units at temperatures from 130° C. to 180° C. and then granulated if desired. The resulting compact and at the same time heat- and light-stabilised compositions may be subjected to conventional forming processes on the usual processing machines, such as injection-moulding machines or extruders.

The usual fillers, pigments and lubricants for example, stearates or axes, may be incorporated into the thermoplastic moulding compositions obtainable by the process according to the invention.

The moulding compositions according to the invention are distinguished by their outstanding antistatic properties. This was all the more surprising insofar as no improvement, or no comparable improvement, in the antistatic properties of graft polymers of styrene and acrylonitrile on elastomeric polymers of conjugated diolefins or of mixtures of these graft polymers with styrene-acrylonitrile polymers, can be obtained solely by using the individual components C and D of the synergistic mixture. The parts and percentages indicated in the following examples are parts and percentages by weight, unless otherwise stated.

EXAMPLE 1

2780 g. of a 28.8% latex of a graft polymer of 36 parts of styrene and 14 parts of acrylonitrile, on 50 parts of a butadiene homopolymer, and 5635 g. of a 42.6% latex of a copolymer (copolymer component B) of 72 parts of styrene and 28 parts of acrylonitrile with a K-value of 61.2, are mixed with 2300 g. of 34.8% latex of a copolymer (copolymer component C) of 50% of butadiene and 50% of butyl acrylate, and 667 g. of a 30% emulsion of a linear polypropylene glycol with an average degree of polymerisation of 37±2 and an OH-number of 56±3. The weight ratio of graft polymer:copolymer B:copolymer C:polyether is thus 20:60:20:5. The polymer-polyether mixture thus prepared is coagulated with a 2% magnesium sulphate solution, the coagulate is separated off, washed free of salts and dried in vacuo at 70–80° C. The dried material is consolidated and homogenised on mills heated at 165° C., drawn off into strips and granulated in a granulator. Circulator discs are injection-moulded from the resulting granulate, and exhibit the data set out in Table 1.

EXAMPLE 2

2780 g. of the 28.8% latex of the graft polymer of 36 parts of styrene and 14 parts of acrylonitrile on 50 parts of a butadiene homopolymer, and 6100 g. of the 42.6% latex of the copolymer (copolymer component B) of 72 parts of styrene and 28 parts of acrylonitrile with a K-value of 61.2 are mixed with 1740 g. of a 34.5% latex of a copolymer (copolymer component C) of 50% of butadiene and 50% of ethyl acrylate, and 667 g. of the 30% emulsion of the linear polypropylene glycol with an average degree of polymerisation of 37±2 and an OH-number of 56±3. The weight ratio of graft polymer: copolymer B:copolymer C:polyether is thus 20:65:15:5.

The polymer-polyether mixture is worked up and further processed as described in Example 1. The electrical data measured on the circular discs are set out in Table 1.

Comparison Example A 2780 g. of the 28.8% latex of the graft polymer of 36 parts of styrene and 14 parts of acrylonitrile, on 50 parts of a butadiene homopolymer and 6100 g. of the 42.6% latex of the copolymer (copolymer component B) of 72 parts of styrene and 28 parts of acrylonitrile with a K-value of 61.2, are mixed with 1740 g. of the 34.5% latex of the copolymer (copolymer component C) of 50% of butadiene and 50% of butyl acrylate. No polyether is added. The weight ratio of graft polymer:copolymer B:copolymer C:polyether is thus 20:65:15:0.

The polymer mixture is worked up and further processed as described in Example 1. Its electrical data are set out in Table 1.

Comparison Example B 4860 g. of the 28.8% latex of the graft polymer of 36 parts of styrene and 14 parts of acrylonitrile on 50 parts of butadiene homopolymer, and 6100 g. of the 42.6% latex of the copolymer (copolymer component B) of 72 parts of styrene and 28 parts of acrylonitrile with a K-value of 61.2, are mixed with 667 g. of the 30% emulsion of the linear polypropylene glycol with an average degree of polymerisation of 37±2 and an OH-number of 56±2. The weight ratio of graft polymer:copolymer B:copolymer C:polyether is thus 35:65:0:5.

The polymer-polyether mixture was worked up and further processed as described in Example 1. The electrical data measured on the circular discs are set out in Table 1.

Explanation of Table 1 and other tables (1) The surface resistance is measured in accordance with DIN 53482 and VDE 0303. Surface resistance and charge were each measured in the same conditioned test atmosphere. The results indicate the resistance between two 10-cm.-long electrodes mounted at a distance of 1 cm. apart.

(2) The plastics disc to be measured is clamped in a resilient holder by means of a ring. An arm covered with the "friction partner" moves over the disc at a frequency of 1 c./s. The field intensity between the test disc charged by friction, and the measuring head is measured and recorded by means of a Schwenkhagen field-intensity meter. The friction partners are fabrics which are close to the positive or negative end of the triboelectric contact series, for example fabrics of polycaprolactam or polyacrylonitrile.

To avoid errors in measurement through the transfer of material from the friction partner to the test specimen, a new specimen is used for each measurement.

Measurements were taken on the following data:

(A) The intensity of the charge after a fixed number of rubbing strokes (rubbing time 30 seconds).

(B) The limit towards which the charge moves on prolonged rubbing (limiting charge).

(C) The time in which the charge fell to half its original intensity on completion of rubbing. (Half-life.)

All measurements were carried out after adequate conditioning in air-conditioned test cabinet. A specimen of known behaviour is used for comparison.

EXAMPLE 3

4170 g. of the 28.8% latex of the graft polymer of 36 parts of styrene and 14 parts of acrylonitrile on 50 parts of a butadiene homopolymer, and 5635 g. of the 42.6% latex of the copolymer (copolymer component B) of 72 parts of styrene and 28 parts of acrylonitrile with a K-value of 61.2, are mixed with 810 g. of a 48.9% latex of a copolymer (copolymer component C) of 50% of butadiene and 50% of dibutyl fumarate and 667 g. of the 30% emulsion of the linear polypropylene glycol with an average degree of polymerisation of 37±2 and an OH-number of 56±3. The weight ratio of graft polymer:copolymer B: copolymer C: polyether is thus 30:60:10:5.

The polymer-polyether mixture is worked up and further processed into circular discs as described in Example 1. The electrical data measured on the circular discs are set out in Table 2.

Comparison Example C

As in Example 3, 4170 g. of the 28.8% latex of the graft polymer, 5635 g. of the 42.6% latex of copolymer B and 810 g. of the 48.9% latex of copolymer C are mixed together in the absence of polypropylene glycol. The latex mixture is worked up and further processed into circular discs as described in Example 1. The electrical data measured on the discs are set out in Table 2.

TABLE 2

|  | Graft polymer | Copolymer B | Copolymer C | Polyether | Surface resistance (Ω) | Friction partner polycaprolactam | | Friction partner polyacrylonitrile | |
| --- | --- | --- | --- | --- | --- | --- | --- | --- | --- |
|  |  |  |  |  |  | Limiting charge (V. cm.⁻¹) | Half-life (secs.) | Limiting charge (V. cm.⁻¹) | Half-life (secs.) |
| Example 3 | 30 | 60 | 10 | 5 | 6·10¹² | +360 | 43 | +710 | 55 |
| Comparison Example C | 30 | 60 | 10 |  | >10¹⁴ | −2,400 | >3,600 | +3,900 | <3,600 |

NOTE.—Comparison of Example 3 according to the invention with comparison Example C shows very clearly that not only is the half-life period greatly reduced, but also that both the surface resistance and the limit charge are lower.

EXAMPLE 4

3890 g. of the 28.8% latex of the graft polymer of 36 parts of styrene and 14 parts of acrylonitrile on 50 parts of a butadiene homopolymer, and 5820 g. of the 42.6% latex of the copolymer (copolymer component B) of 72 parts of styrene and 28 parts of acryolnitrile with a K-value of 61.2 are mixed with 1090 g. of a 36.6% latex of a copolymer (copolymer component C) of 50% of butadiene and 50% of methyl methacrylate, and 667 g. of the 30% emulsion of the linear polypropylene glycol with an average degree of polymerisation of 37±2 and an OH-number of 56±3. The weight ratio of graft polymer: copolymer B: copolymer C: polyether is thus 28:62:10:5.

The mixture thus prepared is coagulated with 2% of magnesium sulphate solution, the coagulate is separated off, washed free of salts and dried in vacuo at 70–80° C. The material is first dried and then consolidated and homogenised on a mill heated to 165° C. It is then granulated and the granulate injection-moulded to form circular discs on which the electrical data set out in Table 3 are measured.

EXAMPLES 5, 6, 7

If the linear polypropylene glycol with an average degree of polymerisation of 37, as used in Example 4, is TABLE 1.—COMPARISON BETWEEN POLYMER-POLYETHER MIXTURES ACCORDING TO THE INVENTION AND MIXTURES CONTAINING ONLY ONE COMPONENT OF THE SYNERGISTIC COMBINATION

|  | Graft polymer | Copolymer B | Copolymer C | Polyether | Surface resistance (Ω) | Friction partner polycaprolactam | | Friction partner polyacrylonitrile | |
| --- | --- | --- | --- | --- | --- | --- | --- | --- | --- |
|  |  |  |  |  |  | Limiting charge (V. cm.⁻¹) | Half-life (secs.) | Limiting charge (V. cm.⁻¹) | Half-life (secs.) |
| Example 1 | 20 | 60 | 20 | 5 | 9·10¹² | +300 | 41 | +700 | 75 |
| Example 2 | 20 | 65 | 15 | 5 | 9·10¹² | +410 | 38 | +920 | 61 |
| Comparison Example A | 20 | 65 | 15 |  | >10¹⁴ | −2,800 | >3,600 | +3,600 | <3,600 |
| Comparison Example B | 35 | 65 |  | 5 | 4·10¹³ | +1,400 | 550 | +1,600 | 730 |

NOTE.—Comparison of Examples 1 and 2 according to the invention with Comparison Examples A and B shows quite clearly that not only is the half-life period reduced very considerably, but also that the surface resistance and the limit charge are both lower.

replaced by branched polypropylene glycols of the following composition:

| Example | Degree of Polymerisation | OH-Number |
|---|---|---|
| 5 | 42±2 | 56±3 |
| 6 | 52±3 | 56±3 |
| 7 | 70±4 | 42±3 | and if the polymer-polyether mixture is processed as described in Example 4, the electrical data set out in Table 3 are obtained.

EXAMPLES 8, 9

If the linear polypropylene glycol with an average degree of polymerisation of 37, as used in Example 4, is replaced by etherified or esterified linear polypropylene glycols of the following composition:

Example 8: Polypropylene glycol monomethyl ether with an average degree of polylmerisation of 36±2 and an OH-number of 28±2, Example 9: Polypropylene glycol diacetate with an average degree of polymerisation of 30±2 and an OH-number of approx. O, and if the polymer-polyether mixture is processed as described in Example 4, the electrical data set out in Table 3 are obtained.

age degree of polymerisation of 37±2 and an OH number of 56±3. The weight ratio of graft polymer to polymer B to polymer C to polyether, is thus 28:64:8:5. After it has been rolled granulated and injection-moulded, the moulding composition thus obtained exhibits the electrical data set out in Table 4.

EXAMPLE 12

4170 g. of the 28.8% latex of the graft polymer of 36 parts of styrene and 14 parts of acrylonitrile on 50 parts of a butadiene homopolymer, and 5820 g. of the 42.6% latex of the copolymer (copolymer component B) of 72 parts of styrene and 28 parts of acrylonitrile with a K-value of 61.2, are mixed with 955 g. of a 33.5% latex of a copolymer (copolymer component C) of 70% of butadiene, 10% of acrylonitrile and 20% of methacrylic acid, and 667 g. of the 30% emulsion of the linear polypropylene glycol with an average degree of polymerisation of 37±2 and an OH-number of 56±3. The weight ratio of graft polymer: copolymer B; copolymer C: polyether is thus 30:62:8:5. The mixture is worked up and further processed as already described. The electrical data measured on the circular discs are set out in Table 4.

EXAMPLE 13

3195 g. of the 28.8% latex of the graft polymer of 36 parts of styrene and 14 parts af acrylonitrile on 50 parts

TABLE 3

| | Graft polymer, amount | Copolymer B, amount | Copolymer C, amount | Polyether PD* | Polyether OH | Polyether Amount | Surface resistance (Ω) | Friction partner polycaprolactam Limiting charge (V. cm.⁻¹) | Friction partner polycaprolactam Half-life (secs.) | Friction partner polyacrylonitrile Limiting charge (V. cm.⁻¹) | Friction partner polyacrylonitrile Half-life (secs.) |
|---|---|---|---|---|---|---|---|---|---|---|---|
| Example 4 | 28 | 62 | 10 | 37 | 56 | 5 | 6·10¹² | +340 | 32 | +820 | 67 |
| Example 5 | 28 | 62 | 10 | 42 | 56 | 5 | 7·10¹² | −820 | 41 | +1,200 | 94 |
| Example 6 | 28 | 62 | 10 | 52 | 56 | 5 | 8·10¹² | −670 | 50 | +1,000 | 82 |
| Example 7 | 28 | 62 | 10 | 70 | 42 | 5 | 7·10¹² | +600 | 49 | +1,310 | 95 |
| Example 8 | 28 | 62 | 10 | 36 | 28 | 5 | 6·10¹² | −580 | 39 | +790 | 45 |
| Example 9 | 28 | 62 | 10 | 30 | 0 | 5 | 9·10¹² | −940 | 75 | +1,180 | 98 |

*PD=Degree of polymerisation.

EXAMPLE 10

3890 g. of the 28.8% latex of the graft polymer of 36 parts of styrene and 14 parts of acrylonitrile on 50 parts of a butadiene homopolymer, and 6005 g. of a 42.6% latex of the copolymer (copolymer component B) of 72 parts of styrene and 28 parts of acrylonitrile with a K-value of 61.2 are mixed with 892 g. of a 35.9% latex of a copolymer (copolymer component C) of 50% of butadiene, 40% of methyl methacrylate and 10% of methacrylic acid and 667 g. of the 30% emulsion of the linear polypropylene glycol with an average degree of polymerisation of 37±2 and an OH—number of 56±3. The weight ratio of graft polymer: copolymer B: copolymer C: polyether is thus 28:64:8:5.

The polymer-polyether mixture is worked up and further processed as already described. The electrical data measured on the circular discs are set out in Table 4.

EXAMPLE 11

3890 g. of the 28.8% latex of the graft polymer of 36 parts of styrene and 14 parts of acrylonitrile and 50 parts of a butadiene homopolymer, and 6005 g. of the 42.6% latex of the copolymer (copolymer component B) of 72 parts of styrene and 28 parts of acrylonitrile with a K-value of 61.2, are mixed with 900 g. of a 35.6% latex of a copolymer (copolymer component C) of 55% of butadiene, 40% of methyl methacrylate, 3% of acrylonitrile and 2% of methacrylic acid, and 667 g. of the 30% emulsion of the linear polypropylene glycol with an averof a butadiene homopolymer, and 7860 g. of a 34.1% latex of a copolymer (copolymer component B) of 70 parts of α-methylstyrene and 30 parts of acrylonitrile with a K-value of 60.0, are mixed with 1090 g. of the 36.6% latex of the copolymer (copolymer component C) of 50% of butadiene and 50% of methyl methacrylate and 667 g. of the 30% emulsion of the linear polypropylate glycol with an average degree of polymerisation of 37±2 and an OH-number of 56±3. The weight ratio of graft polymer: copolymer B: copolymer C: polyether, is thus 23:67:10:5.

The polymer-polyether mixture was worked up and further processed as already described. The electrical data measured on circular discs are set out in Table 4.

EXAMPLE 14

2770 g. of a 28.9/ latex of a graft polymer of 36 parts of styrene and 14 parts of acrylonitrile on 50 parts of a copolymer of 90% of butadiene and 10% of styrene, and 5635 g. of the 42.6% latex of the copolymer (copolymer component B) of 72 parts of styrene and 28 parts of acrylonitrile with a K-value of 61.2, are mixed with 2285 g. of a 35.0% latex of a copolymer (copolymer component C) of 40% of butadiene and 60% of butyl acrylate, and 667 g. of the 30% emulsion of the linear polypropylene glycol with an average degree of polymerisation of 37±2 and an OH-number of 56±3. The weight ratio of graft polymer; copolymer B:copolymer C:polyether, is thus 20:60:20:5.

The polymer-polyether mixture is worked up and further processed as already described. The electrical data measured on the circular discs are set out in Table 4.

TABLE 4

| | Graft polymer | Copolymer B | Copolymer C | Poly-ether | Surface resistance (Ω) | Friction partner polycaprolactam | | Friction partner polyacrylonitrile | |
|---|---|---|---|---|---|---|---|---|---|
| | | | | | | Limiting charge (V. cm.$^{-1}$) | Half-life (secs.) | Limiting charge (V. cm.$^{-1}$) | Half-life (secs.) |
| Example 10 | 28 | 64 | 8 | 5 | 7·10$^{12}$ | −740 | 30 | +800 | 51 |
| Example 11 | 28 | 64 | 8 | 5 | 8·10$^{12}$ | −1,050 | 57 | +630 | 50 |
| Example 12 | 30 | 62 | 8 | 5 | 7·10$^{12}$ | −860 | 38 | +690 | 43 |
| Example 13 | 23 | 67 | 10 | 5 | 6·10$^{12}$ | +540 | 30 | +850 | 18 |
| Example 14 | 20 | 60 | 20 | 5 | 8·10$^{12}$ | +490 | 37 | +730 | 62 |

What is claimed is:

1. An antistatic moulding composition which comprises
    (A) 5 to 98% by weight of a graft copolymer prepared by the graft polymerization of 10 to 95% by weight of a mixture of
        (a) 50 to 90% by weight of styrene, an alkyl derivative thereof or mixtures thereof and 50 to 10% by weight of acrylonitrile, an alkyl derivative thereof or a mixture thereof on
        (b) 90 to 5% by weight of a polymer of a conjugated diolefin containing at least 80% by weight of polymerized diolefin and at most 20% by weight of polymerized styrene, acrylonitrile, an alkyl derivative thereof or a mixture thereof;
    (B) 0 to 93% by weight of a thermoplastic copolymer of
        (a) 50 to 90% by weight of styrene, an alkyl derivative thereof or a mixture thereof and
        (b) 50 to 5% by weight of acrylonitrile, an alkyl derivative thereof or a mixture thereof, the total amount of styrene and acrylonitrile or their alkyl derivatives in components (A) and (B) being not less than 50% by weight;
    (C) 1 to 35% by weight of a copolymer of
        (a) 90 to 10% by weight of a conjugated diolefin and
        (b) 10 to 90% by weight of an ester of an ethylenically unsaturated carboxylic acid with an aliphatic alcohol of 1–10 carbon atoms, a nitrile of an ethylenically unsaturated carboxylic acid, acrylic acid, methacrylic acid or a mitxure thereof and
    (D) 1 to 10% by weight of a polypropylene glycol whose degree of polymerization is from 10 to 1000 and whose terminal hydroxyl groups may be completely or partially etherified with an aliphatic alcohol containing 1 to 20 carbon atoms or completely or partially esterified with an aliphatic carboxylic acid containing 1 to 18 carbon atoms.

2. The antistatic moulding composition of claim 1 wherein component (A) comprises from 5 to 60% by weight of said composition.

3. The antistatic moulding composition of claim 1 wherein component (A) comprises from 10 to 80% by weight of (a) and 90 to 20% by weight of (b).

4. The antistatic moulding composition of claim 1 wherein the graft base of component (A) is a polymer of butadiene.

5. The antistatic moulding composition of claim 1 wherein the graft base of component (A) is a polymer of isoprene.

6. The antistatic moulding composition of claim 1 where the graft base of component (A) is a copolymer of butadiene and isoprene.

7. The antistatic moulding composition of claim 1 wherein (b) of component (C) is an ester of acrylic, methacrylic or fumaric acid with an aliphatic alcohol of 1–10 carbon atoms, a nitrile of acrylic, methacylic or fumaric acid or a mixture thereof.

8. The antistatic moulding composition of claim 1 wherein component (C) is a copolymer of (a) 90 to 10% by weight of butadiene and (b) 10 to 90% by weight of an ester of acrylic, methacrylic or fumaric acid with an aliphatic alcohol containing 1–10 carbon atoms, a nitrile of acrylic, methacrylic or fumaric acid, acrylic acid, methacrylic acid or a mixture thereof.

9. The antistatic moulding composition of claim 1 wherein the degree of polymerization of said polyproylene glycol is from 10 to 200.

References Cited

UNITED STATES PATENTS 2,802,808    8/1957    Hayes _____ 260—876

FOREIGN PATENTS 1,410,262    8/1965    France.

SAMUEL H. BLECH, Primary Examiner

C. J. SECCURO, Assistant Examiner

U.S. Cl. X.R.

260—23.7, 31.4, 33.2, 880, 887, 893